US012668916B2

(12) United States Patent
Yi

(10) Patent No.: US 12,668,916 B2
(45) Date of Patent: Jun. 30, 2026

(54) POWER SUPPLY CIRCUIT OF GARMENT STEAMER AND GARMENT STEAMER

(71) Applicant: SHEN ZHEN RONE PHOENIX NEST DESIGN DEVELOPMENT CO., LTD, Shenzhen (CN)

(72) Inventor: YongJie Yi, Shenzhen (CN)

(73) Assignee: SHEN ZHEN RONE PHOENIX NEST DESIGN DEVELOPMENT CO., LTD, Shenzhen (CN)

( * ) Notice: Subject to any disclaimer, the term of this patent is extended or adjusted under 35 U.S.C. 154(b) by 163 days.

(21) Appl. No.: 18/888,863

(22) Filed: Sep. 18, 2024

(65) Prior Publication Data

US 2026/0062855 A1     Mar. 5, 2026

(30) Foreign Application Priority Data

Aug. 31, 2024     (CN) .......................... 202422135301.7

(51) Int. Cl.
| | |
|---|---|
| *H02J 3/00* | (2026.01) |
| *D06F 75/10* | (2006.01) |
| *D06F 75/26* | (2006.01) |
| *D06F 75/28* | (2006.01) |

(52) U.S. Cl.
CPC .............. *D06F 75/28* (2013.01); *D06F 75/10* (2013.01); *D06F 75/26* (2013.01); *H02J 3/00* (2013.01)

(58) Field of Classification Search
CPC .. H02J 3/00; D06F 75/06; D06F 75/08; D06F 75/2628
See application file for complete search history.

(56) References Cited

U.S. PATENT DOCUMENTS

| | | | |
|---|---|---|---|
| 6,212,332 B1 * | 4/2001 | Sham ...................... | D06F 75/12 392/404 |
| 2024/0279867 A1 * | 8/2024 | Yu .......................... | D06F 87/00 |

FOREIGN PATENT DOCUMENTS

CN          213934580 U  *  8/2021

* cited by examiner

*Primary Examiner* — Nathan E Durham
(74) *Attorney, Agent, or Firm* — Olive Law Group, PLLC

(57) ABSTRACT

A garment steamer and its power supply circuit, wherein the power supply circuit comprises a power supply module, a water pump control module, a heating wire control module and a controller. The power supply module's input and output ends are respectively connected to an alternating current (AC) mains and the controller. The heating wire control module's two ends are respectively connected to the power supply module and the controller. The water pump control module comprises a water pump, a diode D4 and a silicon controlled rectifier (SCR) Q2, wherein the SCR Q2 is used for controlling the water pump's power supply circuit. The water pump's two ends are respectively connected to the power supply module and an anode of the diode D4. The SCR Q2's control electrode is connected to the controller and the SCR Q2's cathode is grounded. The garment steamer includes the said power supply circuit.

18 Claims, 6 Drawing Sheets

POWER SUPPLY CIRCUIT OF GARMENT STEAMER AND GARMENT STEAMER

CROSS-REFERENCE TO RELATED APPLICATIONS

The present application claims the benefit of Chinese Patent Application No. 202422135301.7 filed on Aug. 31, 2024, the contents of which are hereby incorporated by reference.

TECHNICAL FIELD

The present application relates to a technical field of garment steamer, in particular to a power supply circuit of a garment steamer and a garment steamer.

BACKGROUND

A garment steamer is a kind of household appliance mainly for ironing clothes to remove wrinkles on clothes. Compared with traditional irons, a garment steamer uses steam to iron clothes without direct contact with the hot base plate. Therefore, the damage to the clothes by a garment steamer is less and the garment steamer is especially suitable for ironing those fabrics that cannot be ironed in high temperature.

The operation principles of the common garment steamers on the market are: pumping water to the heating element through the water pump, generating steam by heating water in the heating element, transferring the steam to the steamer nozzle through a duct and spraying the hot steam to the clothes to make the fiber soft and smooth.

When using the garment steamer, it is necessary to control the amount of steam of the garment steamer. Otherwise, nonuniform or unstable amount of steam will result in poor ironing effect or even damage to the clothes. Current garment steamers are provided with high-power components to control the heating power of the heating wire so as to further control the output amount of steam of the garment steamers. However, the heat of the high-power components is large and heat sinks are required for heat dissipation to guarantee the normal operation of the garment steamers, which contributes to the high production cost of garment steamers.

SUMMARY

In order to overcome the shortcomings in prior art, the present application provides a power supply circuit of a garment steamer and a garment steamer, wherein the garment steamer includes the power supply circuit and realizes controlling the amount of steam under the situation of reducing the production cost.

The technical solution adopted by the present application for solving the technical problem is:

A power supply circuit of a garment steamer, comprises a power supply module, a water pump control module, a heating wire control module and a controller. An input end of the power supply module is connected to an alternating current (AC) mains, and an output end of the power supply module is connected to the controller. Two ends of the heating wire control module are respectively connected to the power supply module and the controller. The water pump control module comprises a water pump, a diode D4 and a silicon controlled rectifier (SCR) Q2, wherein the SCR Q2 is used for controlling the turn-on or turn-off of the power supply circuit of the water pump. One end of the water pump is connected to the power supply module and another end of the water pump is connected to an anode of the diode D4. A cathode of the diode D4 is connected to an anode of the SCR Q2 and a cathode of the SCR Q2 is grounded. A control electrode of the SCR Q2 is connected to the controller.

Further, the heating wire control module comprises a first heating wire, a second heating wire and a toggle switch. The first heating wire is applicable to a voltage of 110V and the second heating wire is applicable to a voltage of 220V. One end of the first heating wire and the second heating wire is connected to the power supply module, and another end of the first heating wire and the second heating wire is respectively connected to different pins of a switch. The toggle switch is connected to the controller.

Further, a capacitor C3, a resistor R11 and a resistor R13 are further arranged between the control electrode of the SCR Q2 and the controller. One end of the resistor R13 is connected to the control electrode of the SCR Q2, and another end of the resistor R13 is connected to the resistor R11. One end of the capacitor C3 is grounded, and another end of the capacitor C3 is connected to a node of the resistor R11 and the resistor R13. The controller is connected to the node of the resistor R11 and the resistor R13.

Further, the water pump control module further includes a compensating circuit, wherein the compensating circuit comprises a resistor R17 and a capacitor C7. The capacitor C7 is connected in series with the resistor R17. One end of the compensating circuit is connected to a node of the diode D4 and the anode of the SCR Q2, and another end of the compensating circuit is connected to a node of the cathode of the SCR Q2 and the ground.

Further, the power supply module comprises a filter circuit, a surge protection circuit, a rectifier circuit, and an off-line voltage regulator. An input end of the filter circuit is connected to a mains power supply, and the surge protection circuit is connected to both ends of the filter circuit. An output end of the filter circuit is connected to an input end of the rectifier circuit and an output end of the rectifier circuit is connected to the off-line voltage regulator. An output end of the off-line voltage regulator is connected to the controller.

Further, the power supply module further includes a detection circuit, wherein the detection circuit comprises a power grid synchronization detection circuit and a power grid voltage detection circuit. An input end of the detection circuit is connected between the surge protection circuit and the rectifier circuit, and an output end of the detection circuit is connected to the controller.

Further, the controller includes a main control chip U3, wherein the type of the main control chip U3 is PFS122. The main control chip U3 has 14 pins. The output end of the power supply module is connected to the pin 1 of the main control chip U3, and the pin 5 of the main control chip U3 is connected to the water pump control module.

Further, a resistor-capacitor (RC) filter circuit is arranged between the power supply module and the pin 1 of the main control chip U3. The RC filter circuit comprises a resistor R6 and a capacitor C4, wherein one end of the resistor R6 is connected to the power supply module, and another end of the resistor R6 is connected to the pin 2 of the main control chip U3. One end of the capacitor C4 is grounded, and another end of the capacitor C4 is connected to a node of the resistor R6 and the pin 2 of the main control chip U3.

Further, the controller is further connected with a screen display circuit, wherein the screen display circuit includes a display screen. The display screen has multiple COM electrodes and the multiple COM electrodes are connected to the controller respectively.

The present application further provides a garment steamer, which includes the aforementioned power supply circuit of a garment steamer.

The beneficial effect of the present application is:

The present application provides a power supply circuit of a garment steamer and a garment steamer. The garment steamer includes the power supply circuit, wherein the power supply circuit includes a water pump control module. By arranging a low-power SCR and a controller, and the cooperation between software and hardware to control the water amount pumped by the water pump, controlling the amount of steam is realized without arranging high-power components and heat sinks, thereby the production cost is reduced.

10—RC filter circuit; 20—power supply module; 21—first current fuse; 22—first rectifier circuit; 23—off-line voltage regulator; 24—temperature switch; 25—heating wire control module; 26—second current fuse; 27—second rectifier circuit; 30—water pump; 40—controller

DETAILED DESCRIPTION OF EMBODIMENTS

To make the purposes, technical solutions and the advantages of the present application more clear, the present application is further described in details with reference to the drawings and embodiments. It should be understood that the specific embodiments illustrated herein are merely for explanation of the present application, rather than limitation of the present application.

Compared with the current garment steamers, the present application provides a power supply circuit of a garment steamer and a garment steamer. By arranging a low-power SCR and a controller, and the cooperation between software and hardware to control the water amount pumped by the water pump, controlling the amount of steam is realized without arranging high-power components and heat sinks, thereby the production cost is reduced.

Figure 1:
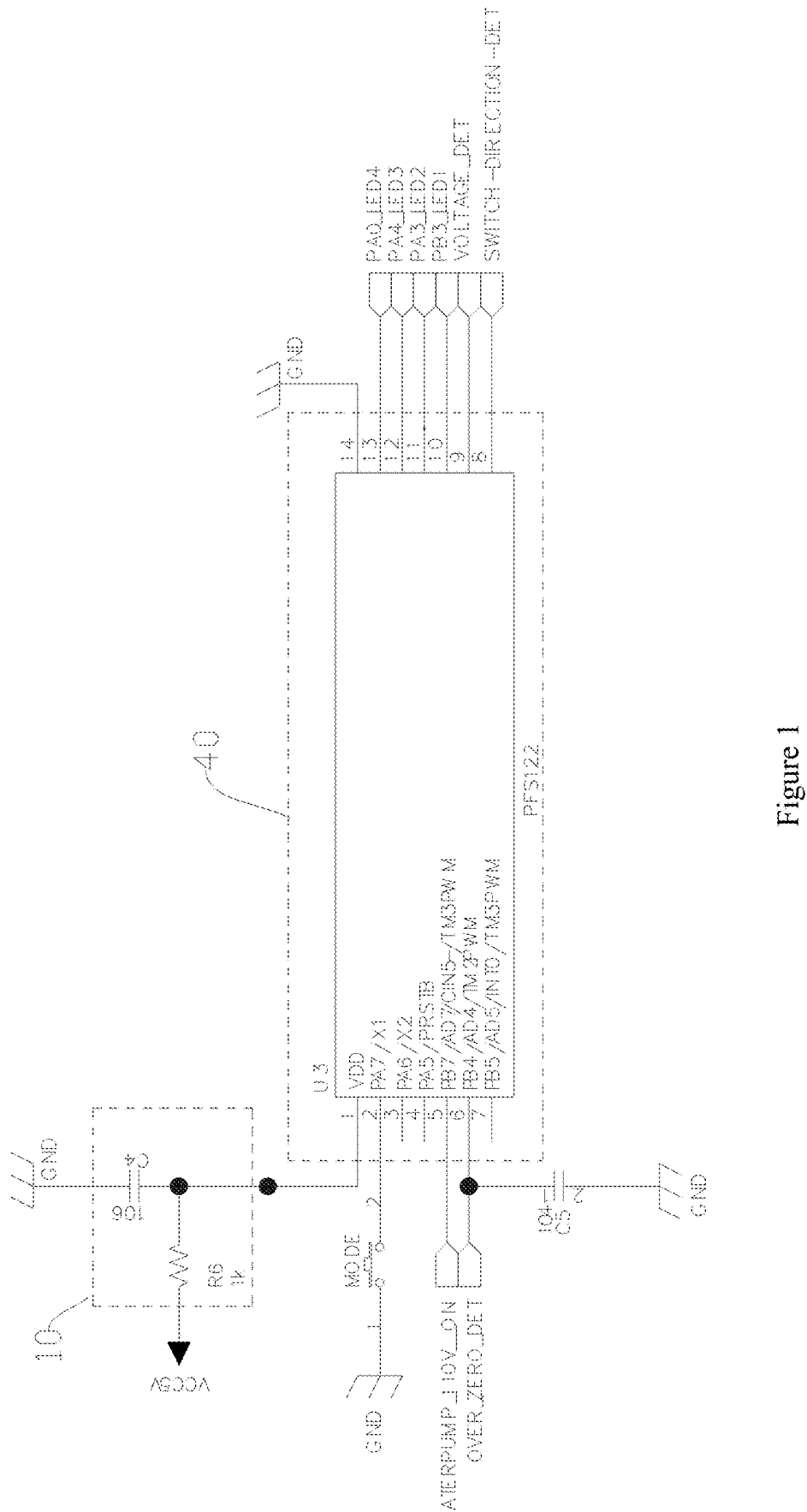
FIG. 1 is a schematic diagram of the circuit structure of the power supply circuit of the garment steamer in the present application.
Figure 2:
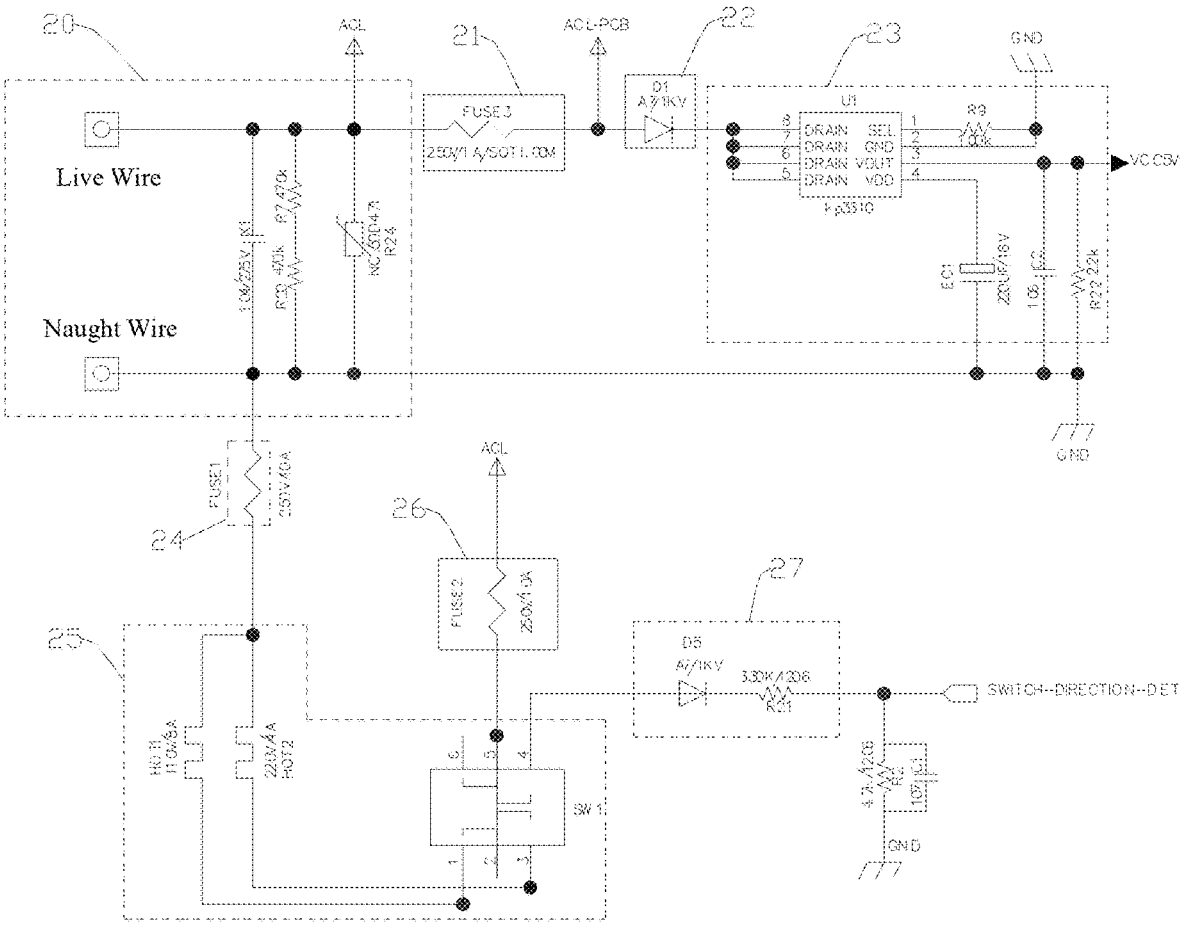
FIG. 2 is a schematic diagram of the power supply module of the power supply circuit of the garment steamer in the present application.
Figure 3:
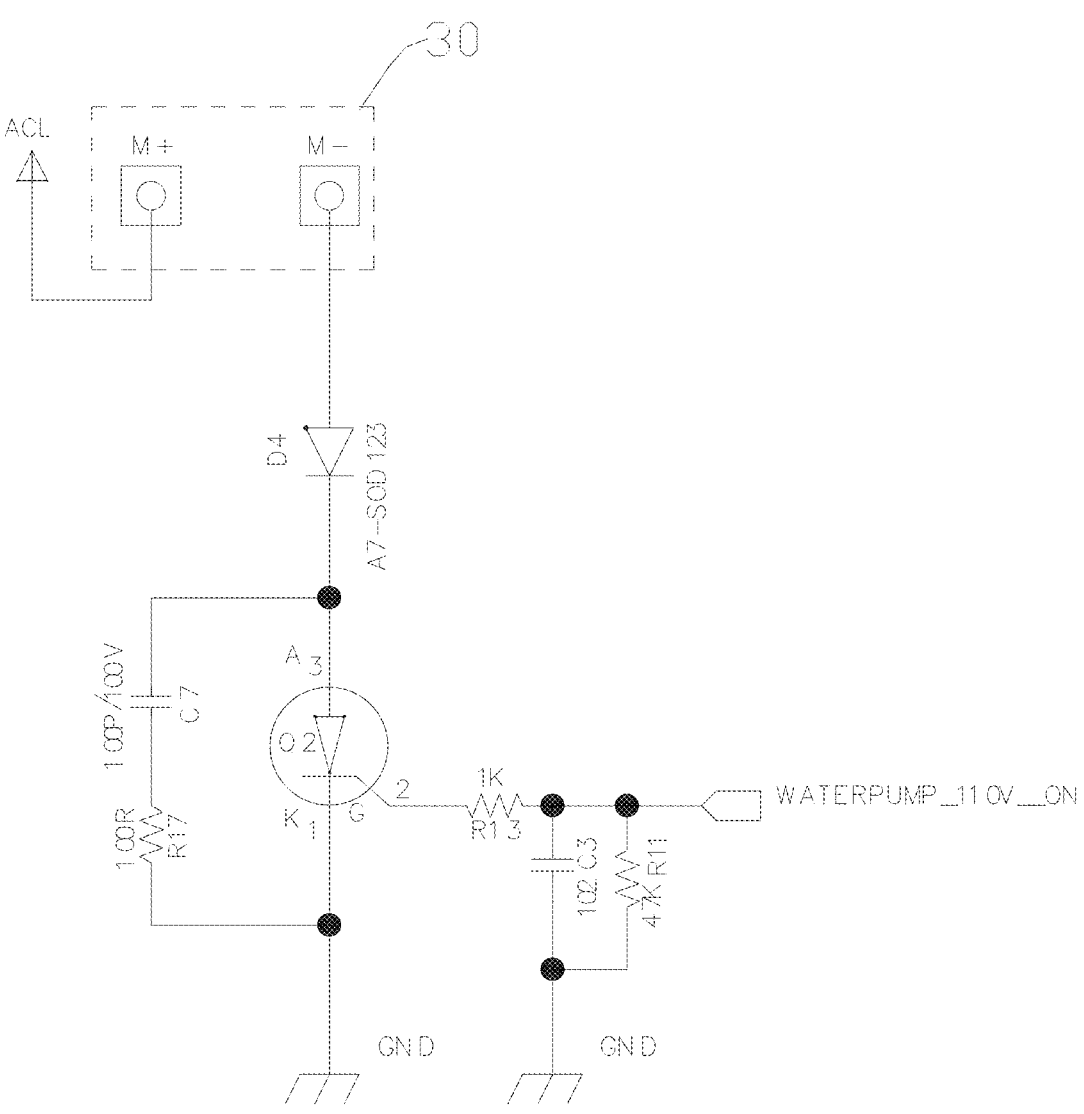
FIG. 3 is a schematic diagram of the water pump control module of the power supply circuit of the garment steamer in the present application.
Figure 4:
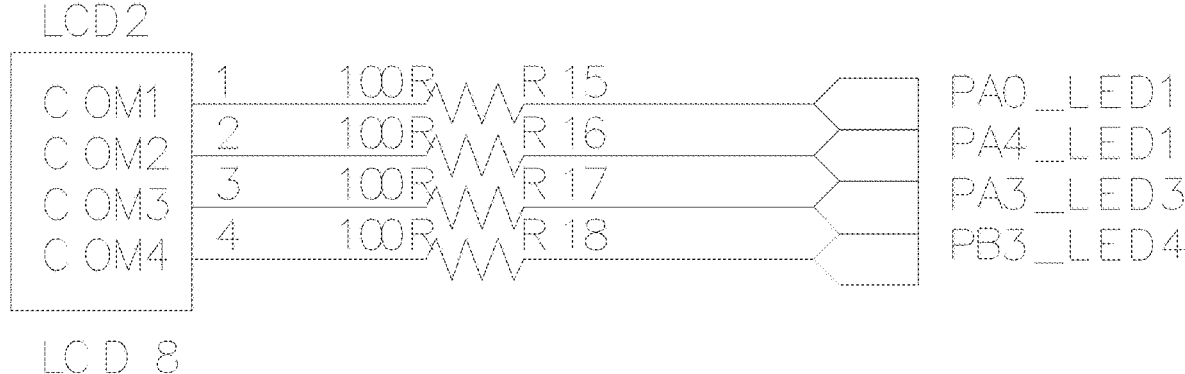
FIG. 4 is a schematic diagram of the screen display circuit of the power supply circuit of the garment steamer in the present application.
Figure 5:
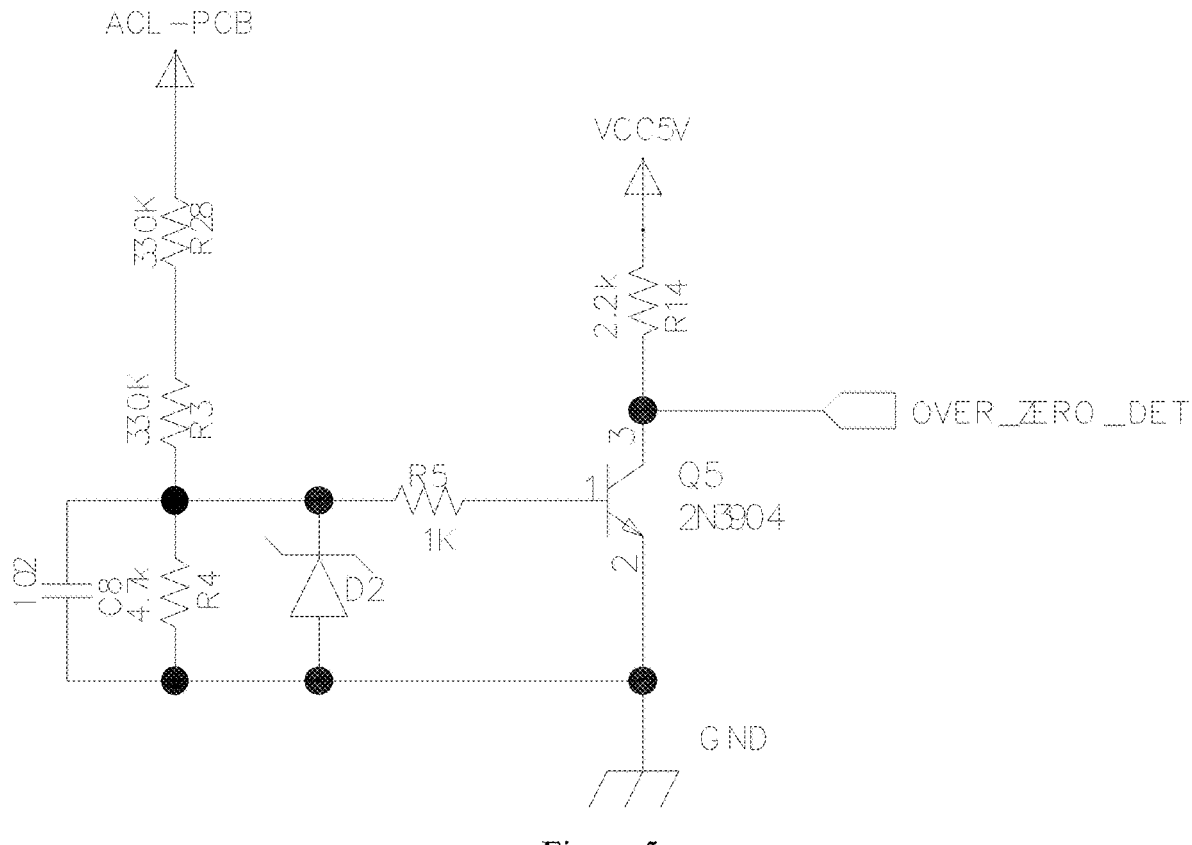
FIG. 5 is a schematic diagram of the power grid synchronization detection circuit of the power supply circuit of the garment steamer in the present application.
Figure 6:
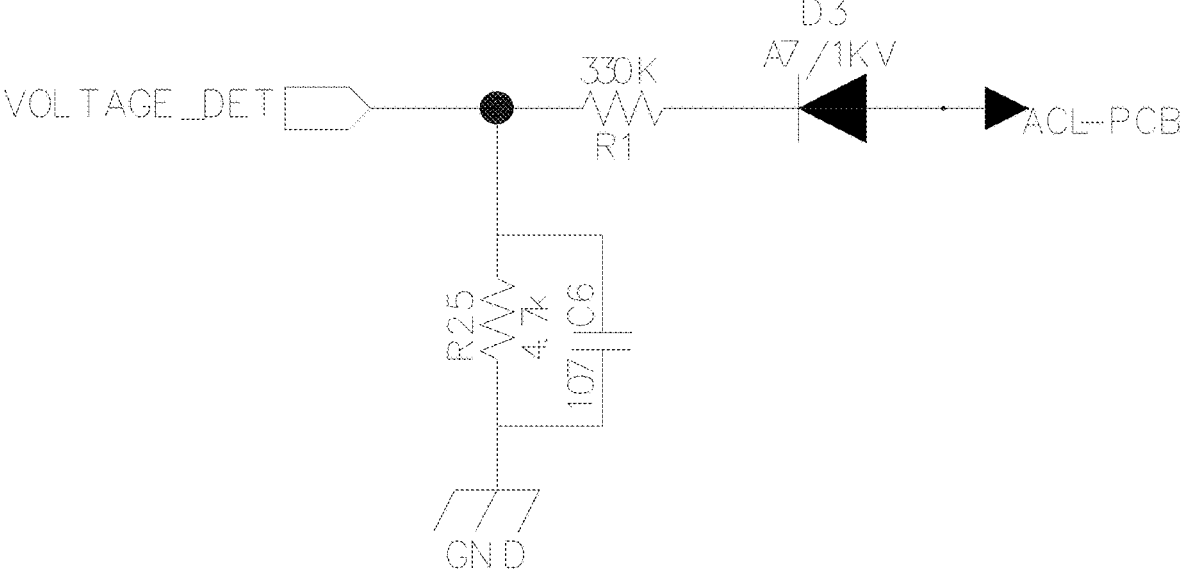
FIG. 6 is a schematic diagram of the power grid voltage detection circuit of the power supply circuit of the garment steamer in the present application.

Referring to FIGS. 1 to 6, the present application provides a power supply circuit of a garment steamer, comprising a power supply module 20, a water pump control module, a heating wire control module 25 and a controller 40.

An input end of the power supply module 20 is connected to an alternating current (AC) mains, and an output end of the power supply module 20 is connected to the controller 40. The power supply module 20 includes a buck voltage regulator circuit, wherein the buck voltage regulator circuit is used for transferring the AC mains to a direct current power supply of +5V to supply power to the controller 40. Two ends of the heating wire control module 25 are respectively connected to the power supply module 20 and the controller 40. One end of the water pump control module is connected to the power supply module 20 and another end of the water pump control module is connected to the controller 40, which controls the water pump control module.

In this embodiment, the water pump control module comprises a water pump 30, a diode D4 and a silicon controlled rectifier (SCR) Q2, wherein the SCR Q2 is used for controlling the turn-on or turn-off of the power supply circuit of the water pump 30. One end of the water pump 30 is connected to the power supply module 20 and another end of the water pump 30 is connected to an anode of the diode D4. A cathode of the diode D4 is connected to an anode of the SCR Q2 and a cathode of the SCR Q2 is grounded. A control electrode of the SCR Q2 is connected to the controller 40. The controller 40 sends a signal to the water pump control module, and the water pump control module activates the water pump 30 when the signal is in effect.

The operation principles of the water pump control module are:

On one hand, the diode D4 plays a role of rectification. Under the action of the diode D4, the AC power input by the power supply module 20 flows through the water pump 30 only in a positive half cycle, thereby the water pump 30 is not working in the negative half cycle of the AC power. On the other hand, the diode D4 plays a role of voltage reduction to protect the circuit from being affected by an excessively high voltage.

When the controller 40 outputs a high level to the SCR Q2, the SCR Q2 is turned on in the positive half cycle of the AC power and the water pump 30 starts working; when the controller 40 outputs a low level to the SCR Q2, the SCR Q2 is turned off in the negative half cycle of the AC power and the power supply circuit of the water pump 30 is disconnected, resulting in the non-working of the water pump 30. Therefore, by controlling the proportion of high level signal and low level signal output from the controller 40 to the control electrode of the SCR Q2 in a unit time, the time proportion of the water pump's 30 being in a working state and a non-working state in a unit time is controlled, i.e., controlling the workload of the water pump 30, so as to control the water amount pumped by the water pump 30 in a unit time. Different water amount pumped by the water pump 30 generates different amount of steam through the heating wire control module 25, thereby controlling the amount of steam of the garment steamer is realized.

The water pump control module further includes a compensating circuit, which reduces the reactive power consumption caused by the inductive load. In this embodiment, the compensating circuit comprises a resistor R17 and a capacitor C7, wherein the capacitor C7 is connected in series with the resistor R17. One end of the compensating circuit is connected to a node of the diode D4 and the anode of the SCR Q2, and another end of the compensating circuit is connected to a node of the cathode of the SCR Q2 and the ground.

In this embodiment, the water pump control module further comprises a capacitor C3, a resistor R11 and a resistor R13. One end of the resistor R13 is connected to the control electrode of the SCR Q2, and another end of the resistor R13 is connected to the resistor R11. One end of the capacitor C3 is grounded, and another end of the capacitor C3 is connected to a node of the resistor R11 and the resistor R13. The controller 40 is connected to the node of the resistor R11 and the resistor R13. The capacitor C3 is used for filtering and removing noise to ensure stable transmission of signals. The resistor R13 and the resistor R17 are used for adjusting current to protect the circuit components.

In this embodiment, the heating wire control module 25 comprises a first heating wire, a second heating wire and a toggle switch. The first heating wire is applicable to a voltage of 110V and the second heating wire is applicable to a voltage of 220V. One end of the first heating wire and the second heating wire is connected to the power supply module 20, and another end of the first heating wire and the second heating wire is respectively connected to different pins of a switch. The toggle switch is connected to the controller 40.

Particularly, the toggle switch includes 6 pins, wherein the pin 1 is connected to the first heating wire; the pin 3 is connected to the second heating wire; the pin 4 is connected to the controller 40 after passing through the second rectifier circuit 27; the pin 5 is connected to the water pump control module after passing through the second current fuse 26. The intermediate node of the second rectifier circuit 27 and the controller 40 is grounded through the resistor R2, and both ends of the resistor R2 are connected in series with the capacitor C1. The capacitor C1 plays a role of filtering to make the output voltage stable and avoid drastic fluctuation.

Regarding most regions in Asia, it is common to use a voltage of 220V and a frequency of 50 HZ. However, for regions like North America, it is common to use a voltage of 110V and a frequency of 60 HZ. This means that there are limitations of application scenarios for many electrical appliances, for which adapters or transformers are required to accommodate the voltage and frequency of different countries.

Nevertheless, the power supply circuit in the present application can switch to different heating wire depending on the input voltage without additional arrangement of adapters or transformers. The operation is easy and convenient for users to use in different regions. The controller 40 can determine if the toggle switch is in a correct position according to the connected power supply voltage, so as to guarantee the normal operation of the garment steamer and avoid damage or safety concerns.

Further, a temperature switch 24 is further arranged between the heating wire control module 25 and the power supply module 20. The temperature switch 24, as a safety device, automatically cuts off the power supply when the temperature exceeds a safety threshold.

In this embodiment, the power supply module 20 comprises a filter circuit, a surge protection circuit, a first rectifier circuit 22, and an off-line voltage regulator 23. An input end of the filter circuit is connected to a mains power supply, and the surge protection circuit is connected to both ends of the filter circuit. An output end of the filter circuit is connected to an input end of the first rectifier circuit 22 and an output end of the first rectifier circuit 22 is connected to the off-line voltage regulator 23. An output end of the off-line voltage regulator 23 is connected to the controller 40.

Further, the power supply circuit is further provided with a first current fuse 21, wherein the first current fuse 21 is arranged between the rectifier circuit and the power supply module 20. When the current in the circuit exceeds the current for normal operation, the first current fuse 21 fuses and cuts off the circuit to prevent the garment steamer from damage caused by overloading.

The type of the off-line voltage regulator 23 is KP3310, wherein the KP3310 incorporates a start-up control circuit, a Voltage Drain Drain (VDD) voltage control circuit, an alternating current (AC) signal synchronization detection circuit, a low dropout voltage regulator. The KP3310 obtains three-level output voltages of 5V/3.3V/2.7V by adjusting the pin resistance of the single event latch-up (SEL). in this embodiment, the KP3310 outputs a voltage of 5V to the controller 40.

In this embodiment, the controller 40 is further connected with a screen display circuit, wherein the screen display circuit includes a display screen. The display screen has multiple COM electrodes and the multiple COM electrodes are connected to different pins of the controller 40 respectively. The controller 40 feeds back the working state of the garment steamer to the screen display circuit, and the screen displays the working state so as to enable a user to conveniently know about the working state of the garment steamer.

In this embodiment, the power supply module 20 further includes a detection circuit, wherein the detection circuit comprises a power grid synchronization detection circuit and a power grid voltage detection circuit. An input end of the detection circuit is connected between the surge protection circuit and the rectifier circuit, and an output end of the detection circuit is connected to the controller 40. The power grid synchronization detection circuit is a known circuit in the field which is not repeated herein. The power grid voltage detection circuit comprises a diode D3, a resistor R1 and a resistor R25, wherein an anode of the diode D3 is connected to an intermediate node of the first current fuse 21 and the first rectifier circuit 22, and a cathode of the diode D3 is connected to the resistor R1. The resistor R1 is connected to the controller 40. The resistor R25 is connected to an intermediate node of the resistor R1 and the controller 40. Both ends of the resistor R25 are connected in series with the capacitor C6. The capacitor C6 plays a role of filtering to make the output voltage stable and avoid drastic fluctuation.

The detection circuit is used for detecting the voltage of the input mains power supply and determining whether the voltage of the mains power supply satisfies the normal operation condition of the garment steamer. If the voltage of the mains power supply does not satisfy the normal operation condition of the garment steamer, the detection circuit send a signal to the controller 40. The controller 40 returns the signal to the screen display circuit and the screen indicates the corresponding error codes, and the garment steamer stops operation in the meanwhile.

In this embodiment, the controller 40 includes a main control chip U3, wherein the type of the main control chip U3 is PFS122 and the main control chip U3 has 14 pins.

The output end of the power supply module 20 is connected to the pin 1 of the main control chip U3, and a resistor-capacitor (RC) filter circuit is arranged between the power supply module 20 and the pin 1 of the main control chip U3. The RC filter circuit 10 comprises a resistor R6 and a capacitor C4, wherein one end of the resistor R6 is connected to the power supply module 20, and another end of the resistor R6 is connected to the pin 2 of the main control chip U3. One end of the capacitor C4 is grounded, and another end of the capacitor C4 is connected to a node of the resistor R6 and the pin 2 of the main control chip U3.

The RC filter circuit 10 fluctuates with a smooth voltage to provide more stable power supply voltage to the main control chip U3.

The controller 40 is further connected with a switching circuit, wherein one end of the switching circuit is connected to the pin 2 of the controller 40, and another end of the switching circuit is grounded. The switching circuit includes a key, and the on-off and mode switching are realized through the key.

The pin 5 of the main control chip U3 is connected to the water pump control module, and the pin 6 of the main control chip U3 is connected to the power grid synchronization detection circuit. The pin 9 of the main control chip U3 is connected to the power grid voltage detection circuit, and the pin 8 of the main control chip U3 is connected to the heating wire control module 25. The pin 10 to pin 13 of the main control chip U3 are connected to the screen display circuit, and the pin 14 of the main control chip U3 is grounded.

The present application further provides a garment steamer which includes the aforementioned power supply circuit of a garment steamer.

The use steps of the garment steamer in the present application are:

First, confirm the toggle switch is in the correct position and press the key to turn on the garment steamer. Control the proportion of high level signal and low level signal output from the controller 40 to the control electrode of the SCR Q2 in a unit time. Control the water amount pumped by the water pump 30 in a unit time. Generate different amount of steam through heating water by the heating wire.

It can be understood that those skilled in the art can, under the guidance of the above embodiments, combine various implementation methods in the above embodiments to obtain technical solutions of multiple implementation methods.

The above description is only preferred embodiments of the present application and is not intended to limit the present application. Any modifications, equivalent substitutions and improvements made within the spirit and principles of the present application should be involved in the protection scope of the present application.

The invention claimed is:

1. A power supply circuit of a garment steamer, comprises a power supply module, a water pump control module, a heating wire control module and a controller;

wherein an input end of the power supply module is connected to an alternating current (AC) mains, and an output end of the power supply module is connected to the controller; two ends of the heating wire control module are respectively connected to the power supply module and the controller;

wherein the water pump control module further comprises a water pump, a diode D4 and a silicon controlled rectifier (SCR) Q2; the silicon controlled rectifier Q2 is used for controlling the turn-on or turn-off of the water pump's power supply circuit; one end of the water pump is connected to the power supply module, and another end of the water pump is connected to an anode of the diode D4; a cathode of the diode D4 is connected to an anode of the silicon controlled rectifier Q2 anode, and a cathode of the silicon controlled rectifier Q2 is grounded; a control electrode of the silicon controlled rectifier Q2 is connected to the controller.

2. The power supply circuit of a garment steamer according to claim 1, wherein the heating wire control module comprises a first heating wire, a second heating wire and a toggle switch; the first heating wire is applicable to a voltage of 110V and the second heating wire is applicable to a voltage of 220V; one end of the first heating wire and the second heating wire is connected to the power supply module, and another end of the first heating wire and the second heating wire is respectively connected to different pins of a switch; the toggle switch is connected to the controller.

3. The power supply circuit of a garment steamer according to claim 1, wherein a capacitor C3, a resistor R11 and a resistor R13 are further arranged between the control electrode of the silicon controlled rectifier Q2 and the controller; one end of the resistor R13 is connected to the control electrode of the silicon controlled rectifier Q2, and another end of the resistor R13 is connected to the resistor R11; one end of the capacitor C3 is grounded, and another end of the capacitor C3 is connected to a node of the resistor R11 and the resistor R13; the controller is connected to the node of the resistor R11 and the resistor R13.

4. The power supply circuit of a garment steamer according to claim 1, wherein the water pump control module further includes a compensating circuit, comprising a resistor R17 and a capacitor C7; the capacitor C7 is connected in series with the resistor R17; one end of the compensating circuit is connected to a node of the diode D4 and the anode of the silicon controlled rectifier Q2, and another end of the compensating circuit is connected to a node of the cathode of the silicon controlled rectifier Q2 and the ground.

5. The power supply circuit of a garment steamer according to claim 1, wherein the power supply module comprises a filter circuit, a surge protection circuit, a rectifier circuit, and an off-line voltage regulator; an input end of the filter circuit is connected to a mains power supply, and the surge protection circuit is connected to both ends of the filter circuit; an output end of the filter circuit is connected to an input end of the rectifier circuit and an output end of the rectifier circuit is connected to the off-line voltage regulator; an output end of the off-line voltage regulator is connected to the controller.

6. The power supply circuit of a garment steamer according to claim 5, wherein the power supply module further includes a detection circuit, comprising a power grid synchronization detection circuit and a power grid voltage detection circuit; an input end of the detection circuit is connected between the surge protection circuit and the rectifier circuit, and an output end of the detection circuit is connected to the controller.

7. The power supply circuit of a garment steamer according to claim 1, wherein the controller includes a main control chip U3, which is PFS122-type; the main control chip U3 has 14 pins; the output end of the power supply module is connected to the pin 1 of the main control chip U3, and the pin 5 of the main control chip U3 is connected to the water pump control module.

8. The power supply circuit of a garment steamer according to claim 7, wherein a resistor-capacitor (RC) filter circuit is arranged between the power supply module and the pin 1 of the main control chip U3; the resistor-capacitor filter circuit comprises a resistor R6 and a capacitor C4, and one end of the resistor R6 is connected to the power supply module, and another end of the resistor R6 is connected to the pin 2 of the main control chip U3; one end of the capacitor C4 is grounded, and another end of the capacitor C4 is connected to a node of the resistor R6 and the pin 2 of the main control chip U3.

9. The power supply circuit of a garment steamer according to claim 1, wherein the controller is further connected with a screen display circuit, including a display screen; the display screen has multiple COM electrodes and the multiple COM electrodes are connected to the controller respectively.

10. A garment steamer, includes the power supply circuit of a garment steamer according to claim 1.

11. A garment steamer, includes the power supply circuit of a garment steamer according to claim 2.

12. A garment steamer, includes the power supply circuit of a garment steamer according to claim 3.

13. A garment steamer, includes the power supply circuit of a garment steamer according to claim 4.

14. A garment steamer, includes the power supply circuit of a garment steamer according to claim 5.

15. A garment steamer, includes the power supply circuit of a garment steamer according to claim 6.

16. A garment steamer, includes the power supply circuit of a garment steamer according to claim 7.

17. A garment steamer, includes the power supply circuit of a garment steamer according to claim 8.

18. A garment steamer, includes the power supply circuit of a garment steamer according to claim 9.

* * * * *